June 17, 1930.  S. A. STAEGE  1,764,362

REGULATOR

Filed May 19, 1928

INVENTOR
Stephen A. Staege
BY
Wesley G. Carr
ATTORNEY

Patented June 17, 1930

1,764,362

UNITED STATES PATENT OFFICE

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA

REGULATOR

Application filed May 19, 1928. Serial No. 279,121.

My invention relates generally to regulators for governing the excitation of dynamo-electric machines and comprises the provision of anti-hunting means for such regulators.

A preferred embodiment of my invention utilizes a variable resistor, which may be of the graphite or carbon-disc type, for varying the resistance of the field circuit of the regulated dynamo-electric machine. This resistor may be actuated in accordance with a desired quantity, such as current, voltage, load or speed of the machine to be regulated.

I have described my invention particularly with reference to regulating the voltage of a generator.

When regulators of this general type are employed in electrical systems for maintaining the voltage of a generator, the graphite elements are connected in the field circuit, and an electromagnetic device responsive to the generator voltage is utilized for varying the pressure on the graphite elements. A variation in the pressure on the graphite elements creates a corresponding change in the resistance of the carbon pile and, in this way, varies the excitation of the field coil in the circuit of which the carbon pile is connected. Ordinarily, the pressure of a spring compresses the graphite discs to a point of minimum resistance and the electromagnetic device functions to release the pressure on the carbon discs upon occurrence of high-voltage conditions, thereby increasing the resistance of the carbon pile and decreasing the excitation of the field circuit in the generator.

When a variation in the generator voltage occurs, an electromagnet responds and produces a desired variation in the pressure on the carbon pile. The impulse given the electromagnet, upon sudden changes of generator voltage, is often sufficient to cause the regulator to over excite the field and, for this reason, anti-hunting devices are provided to bring the regulator to a steady condition.

The object of my invention, generally stated, is to provide a regulator which shall be positive in its action, quickly responsive to the regulated quantity and having anti-hunting characteristics.

A further object of my invention is to provide an anti-hunting device for a regulator of the above-described type.

Other objects of my invention will become apparent to those skilled in the art when the following description is considered in connection with the accompanying drawings.

An embodiment of my invention provides a regulator of the carbon-pile type in which an electromagnet for operating the regulator is connected across the source of voltage which is to be regulated, and the carbon pile is connected in series with a field coil which governs the excitation of the generating source. The electromagnet is connected, through a system of levers, to a carbon pile and is disposed to reduce the pressure exerted on the carbon pile upon the occurrence of a high-voltage condition.

In the accompanying drawings:—

Figure 1:
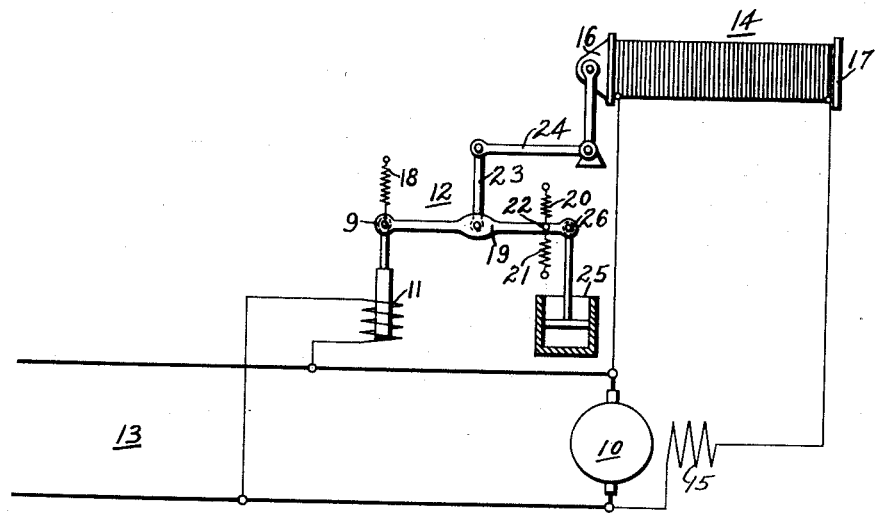
Figure 1 is a diagrammatic view of a regulator constructed in accordance with my invention and applied to regulate the voltage of a direct-current generator.

For regulating the voltage of a direct-current generator 10, a coil of an electromagnet 11, which controls the operation of a regulator 12, is connected across supply conductors 13 that are supplied with voltage from the terminals of the generator 10. A carbon-pile element 14 is connected in series-circuit relation with a shunt field winding 15 of the generator 10, and is disposed to vary the resistance of the shunt field circuit, thereby varying the exciting current of the shunt field winding 15, and the terminal voltage of the generator 10.

The regulator 12 comprises the carbon-pile element 14, which is made up of a plurality of current-conducting graphite discs, and the resistance of the carbon-pile element 14 may be changed by changing pressure exerted between the supporting members 16 and 17. A spring 18 applies a force to the supporting member 16 of the graphite discs when the electromagnet 11 is deenergized, and the carbon pile is compressed to the point of its minimum resistance, thereby allowing the maximum excitation of the shunt field winding 15. The electromagnet 11 is mechanically connected to oppose the action of the spring 18 with a force that varies in accordance with the voltage between the supply conductors 13. The position of the electromagnet 11 determines the pressure exerted upon the carbon pile 14, and a variation in its position causes a corresponding variation in the resistance of the shunt field circuit increasing or decreasing the excitation of the shunt field winding and causing the terminal voltage of the generator 10 to rise or fall to a value depending upon the setting of the regulator.

A rod 23 is provided, one end of which is pivotally connected to the lever 19 and the other end of which is pivotally connected to one arm of a bell-crank lever 24. The other arm of the bell-crank lever 24 is connected to the support 16.

A point 22 on the lever 19, that is located between its pivotal connection with the rod 23 and the point 26, is normally biased, by springs 20 and 21, to a predetermined position. A dash-pot 25 is connected to the lever 19 at the point 26 and is provided for a purpose to be later explained.

During the desired operation of the generator 10, a voltage will be maintained such that the pull of the magnet 11 is equal to the pull of the spring 18, and the magnet is in a definite position. If the voltage of the generator rises suddenly, the energization of the electromagnet 11 will increase, exerting a force on the lever member 19, to cause it to rotate in a counter-clockwise direction about the pivot point 26 until opposed by an equal pull of the spring 18. This movement will be transmitted through the levers 19, 23 and 24 to release the pressure on the carbon-pile element 14 and increase the resistance of the shunt field circuit, thereby decreasing the excitation of the shunt field winding 15 and creating a corresponding decrease in the terminal voltage of the generator 10. The rotation of the lever 19 in a counter-clockwise direction about the pivot point 26 causes an increase in the tension of the spring 20 and a decrease in the tension of the spring 21. The lever 19 will, therefore, be biased in a counter-clockwise direction about the pivot point 9 against the action of the dash-pot 25 which permits only a delayed movement of the lever 19. The latter described motion of the lever 19 moves the rod 23 upwardly, thus slightly increasing the pressure on the resistor 14 and introducing a reaction or antihunting action into the system. Upon the return of the generator voltage to its normal value, the electromagnet 11 again returns to its normal position.

If the voltage of the generator 10 decreases with respect to its desired value, the electromagnet 11 and the pivot point 22 are actuated upwardly, thus decreasing the resistance of the resistor 14 and increasing the generator voltage. The biasing springs 20 and 21 cause the right-hand end of the lever 19 to be actuated downwardly, thus slightly decreasing the pressure on the resistor 14 and again introducing an antihunting action into the system.

The resilient mounting of the lever 19 permits its center of rotation to be varied in accordance with the magnitude of the impulse given it. When a variation in the energization of the electromagnet 11 takes place, the lever 19 is actuated and either the spring 20 or the spring 21 is stretched. The position of the pivot point 22 varies in accordance with the magnitude of the impulse given the lever 19, only slight variation in its position occurring when a gradual change in energization of the electromagnet 11 takes place; a greater change taking place upon the occurrence of a sudden change in the energization of the electromagnet 11. The springs 20 and 21 allow the regulator to travel more than enough to compensate for the change in energization of the electromagnet 11, and the action of the dash-pot 25 allows the regulator to recede to the proper position before the excitation of the field winding 15 has reached the value corresponding to the first movement of the regulator. In this way, the regulator "overshoots" the field to produce a quick response in the generator voltage and gradually returns to the proper position at a rate determined by the dash-pot 25.

Since the center of rotation for the lever member 19 is at different points on the lever for each of these conditions, and forces of different magnitudes are applied to stabilize the regulator under each of these conditions, the regulator is as well adapted to correct great variations in the voltage of the generator 10 as slight or gradual variations in the voltage.

Figure 2:
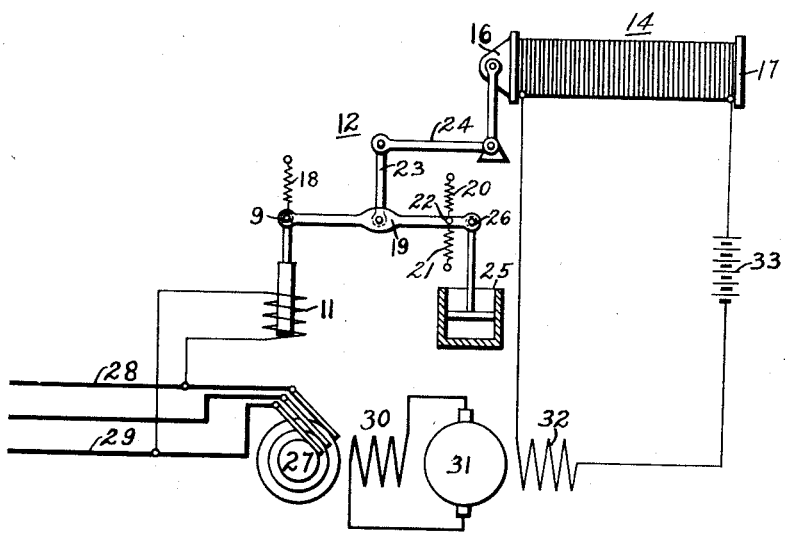
Fig. 2 is a diagrammatic view of my regulator, as applied to regulate the voltage of an alternating-current system.

In Fig. 2, the regulator 12 is adapted to regulate the voltage generated in the alternating-current generator 27, the coil of the electromagnet 11 being connected across the conductors 28 and 29, representing one phase of the voltage generated in the generator 27. The field coils 30 of the alternating-current generator 27 are energized from the exciter generator 31 in accordance with common practice, and the field coils of the exciter generator 31 are energized from a separate source of excitation, such as the battery 33. The carbon-pile element of the regulator 12 is, in this case, connected in circuit with the field coils 32 of the exciter 31. It will be apparent that a change in the energization of the electromagnet 11, in response to a variation in voltage between the conductors 28 and 29, will be transmitted, in the manner described above, to vary the pressure on the carbon-pile element 14 and create a corresponding change in the excitation of the exciter generator 31. Upon the variation of the voltage generated in the exciter generator 31, a corresponding change in the excitation of the field coils 30 for the alternating-current generator takes place and, accordingly, a desired change in the voltage between the conductors 28 and 29.

Since it is possible to modify the embodiments of my invention hereinbefore set forth and adapt it to numerous applications without departing from the spirit and scope of the invention, it is desired that the above description shall be construed as entirely illustrative and not in a limiting sense.

I claim as my invention:

1. In a regulator of the carbon-pile type, a plurality of current-conducting discs, electromagnetic means and operating mechanism actuated thereby for varying the resistance of said discs in accordance with the energization thereof, said operating mechanism comprising a lever, one end of which is connected to said electromagnetic means, means for resiliently supporting a point on said lever, retarding means pivotally attached to said lever whereby, upon sudden movement of said lever, the supported point will be displaced and gradually restored to its original position by the yielding of the retarding device.

2. In a regulator of the carbon-pile type, a plurality of current-conducting discs, resilient means for applying pressure to said discs, electromagnetic means opposing said resilient means for releasing the pressure on said discs in accordance with the energization of the electromagnet means, a resiliently suspended lever connected between said discs and said electromagnetic means, and anti-hunting means comprising said resiliently suspended lever and a retarding device pivotally connected to said lever, said lever being disposed for rotation about the point of resilient suspense when the rate of such motion is not greater than permitted by the retarding device.

3. In a regulator of the carbon-pile type, a plurality of current-conducting discs, resilient means for exerting a pressure on said discs, electromagnetic means opposing said resilient means and a pivotally mounted lever actuated thereby for releasing the pressure on said discs in accordance with the energization thereof, and anti-hunting means coacting with the electromagnetic means comprising said pivotally mounted lever, a plurality of springs biasing said pivot in a normal position, and a retarding device pivotally mounted on the lever to provide a center of rotation for the lever when the lever is displaced at a rate in excess of that permitted by the retarding device, said springs reacting to restore the pivot to its normal position at a rate determined by the retarding device.

4. In a regulating device, regulator means disposed to be actuated in accordance with the quantity to be regulated and anti-hunting means cooperating therewith comprising a lever member, a retarding device associated with the lever, and resilient means for changing the axis of rotation of the lever member upon sudden impulses, whereby said lever member may be displaced more rapidly than is permitted by the retarding device, said resilient means being disposed to bias the lever and restore the axis of rotation to its normal position during the yielding of the retarding device.

5. In combination, a dynamo-electric machine comprising an armature winding and a field winding, a resistor element for varying the excitation of said field winding, electroresponsive means actuated in accordance with a characteristic of said dynamo-electric machine for actuating said resistor element, an element connected between said resistor element and said electroresponsive means having a pivot point actuated by said electroresponsive means, a pivot point connected to actuate said resistor element, and a pivot point biased to a predetermined position, and retarding means for delaying the motion of said last named point to or from said position.

In testimony whereof, I have hereunto subscribed my name this 15th day of May, 1928.

STEPHEN A. STAEGE.